United States Patent
Colomb et al.

(10) Patent No.: US 11,786,877 B2
(45) Date of Patent: Oct. 17, 2023

(54) IRON CATALYZED HYDROCHLORINATION OF SILICON TETRACHLORIDE TO TRICHLOROSILANE

(71) Applicants: Mitsubishi Polycrystalline Silicon America Corporation (MIPSA), Theodore, AL (US); HIGH-PURITY SILICON CORPORATION, Yokkaichi (JP)

(72) Inventors: Matthias A. Colomb, Theodore, AL (US); Bryan H. Nettles, Theodore, AL (US)

(73) Assignees: Mitsubishi Polycrystalline Silicon America Corporation (MIPSA), Theodore, AL (US); HIGH-PURITY SILICON CORPORATION, Yokkaichi (JP)

( * ) Notice: Subject to any disclaimer, the term of this patent is extended or adjusted under 35 U.S.C. 154(b) by 294 days.

(21) Appl. No.: 17/209,835

(22) Filed: Mar. 23, 2021

(65) Prior Publication Data

US 2021/0291133 A1  Sep. 23, 2021

Related U.S. Application Data

(60) Provisional application No. 62/993,246, filed on Mar. 23, 2020.

(51) Int. Cl.
*B01J 8/18* (2006.01)
*B01J 8/34* (2006.01)
(Continued)

(52) U.S. Cl.
CPC .......... *B01J 8/1827* (2013.01); *B01J 8/1872* (2013.01); *C01B 33/10763* (2013.01); *B01J 2208/00938* (2013.01)

(58) Field of Classification Search
CPC ............... B01J 8/1827; B01J 8/1872; B01J 2208/00938; B01J 8/34; B01J 2208/00902; B01J 8/44; B01J 8/18; C01B 33/10763
(Continued)

(56) References Cited

U.S. PATENT DOCUMENTS

| | | | |
|---|---|---|---|
| 2010/0264362 A1* | 10/2010 | Chee | B01J 8/1836 252/182.1 |
| 2011/0297884 A1* | 12/2011 | Chee | B01J 8/44 252/372 |

OTHER PUBLICATIONS

M. Colomb et al., "Experimental verification of scalable model for hydrochlorination reaction in a pilot-scale fluidized bed reactor," Powder Technology 301, 2016, pp. 989-998.
(Continued)

*Primary Examiner* — Huy Tram Nguyen
(74) *Attorney, Agent, or Firm* — Locke Lord LLP (57) ABSTRACT

In the hydrochlorination reaction, silicon tetrachloride (STC), metallurgical silicon, and hydrogen are converted to trichlorosilane (TCS) at about 540° C. Previously, a pilot-scale reactor was used to study the yield of TCS produced by the hydrochlorination reaction. The yield observed by experimentation compared favorably with a scalable mathematical model developed to predict the rate of TCS conversion. The model predicted that 90% of the final amount of TCS produced was achieved after the reactant gas traveled a quarter of the vertical distance in the reaction section of the reactor. The pilot-scale reactor was shortened to verify the model predictions. In addition, some catalytic effects on the reaction were studied.

15 Claims, 3 Drawing Sheets

(51) Int. Cl.
　　　*B01J 8/44*　　　　(2006.01)
　　　*C01B 33/107*　　(2006.01)
(58) Field of Classification Search
　　　USPC .......................................................... 423/342
　　　See application file for complete search history.

(56) References Cited

OTHER PUBLICATIONS

M. Colomb et al., "Modeling the Hydrochlorination reaction in a laboratory-scale fluidized bed reactor," Power Technology 292, 2016, pp. 242-250.
Rainer Josef Lehnen; "Studies on the Catalyzed Hydrochlorination of Metallurgical Silicon with Silicon Tetracchloride and Hydrogen in a Laboratory Fixed-bed Reactor"; Dissertation Ruhr-University Bochum; 2002; 174 pages; Bochum, Germany and its English abstract.
Frank Becker; "Modeling and Simulation of the Hydrochlorination of Silicon to Trichlorosilane for the Development of an Industrial Fluidized Bed Reactor"; Dissertation; Rheinisch-Westfalische Technische Hochschule Aachen (RWTH Aachen University); 2005; 151 pages; Aachen, Germany and its English abstract.
M. Colomb et al.; "Effects of Shortening a Pilot-Scale Hydrochlorination Reactor with Catalytic Considerations and Comparison to Mathematical Model Predictions"; Silicon for the Chemical and Solar Industry XV; Jun. 2020; Trondheim, Norway, 12 pages.

* cited by examiner

IRON CATALYZED HYDROCHLORINATION OF SILICON TETRACHLORIDE TO TRICHLOROSILANE

BACKGROUND OF THE INVENTION

1. Field of the Invention

The present invention relates to the use of iron reactor internals to catalyze the hydrochlorination reaction of silicon tetrachloride, hydrogen, and metallurgical silicon to trichlorosilane.

2. Description of the Related Art

The apparatus for producing trichlorosilane (TCS) from the hydrochlorination of silicon tetrachloride (STC) with hydrogen in the presence of metallurgical silicon (Me-Si) includes a reactor, a method to feed silicon to the reactor, and a gas introduction device for the reactant gases STC and hydrogen. In the reactor, the Me-Si is fluidized by the STC and hydrogen gas and produces TCS which is discharged from the top of the reactor. The STC and hydrogen are heated before introduction into the reactor to temperatures between 425-725° C. The reaction is catalyzed by metals, primarily iron impurities inherent to the metallurgical silicon, but conversion is insufficient without further catalysis. The reaction is typically catalyzed with various types of copper catalyst such as Copper (II) Chloride, Copper (I) Chloride, Copper, Copper (I) Oxide, Copper (II) Oxide, and copper alloyed silicon including blends of the like. The reaction may also be catalyzed with iron alloyed silicon or iron catalysts like Iron (II, III) Oxide and Iron (II) Oxide.

BRIEF SUMMARY OF THE INVENTION

Me-Si is fluidized in a fluidized bed reactor by placing it in contact with a blend of STC and hydrogen gas. The reaction is carried out with excess Me-Si and is viable in large molar ratios of hydrogen to STC (0.5-2.5 molar). First, the hydrogen and STC rise through the solid phase bed. Next the hydrogen and STC gases coalesce as bubbles and grow in size as they rise through the reactor resulting in mass transfer inefficiencies. The reaction is typically carried out at between 590-680° C.

The silicon is typically catalyzed for improved conversion yields of TCS. Iron or copper catalyst is either blended with the silicon, injected into the reactor, or iron and copper are alloyed with the metallurgical silicon. Alloying reduces the amount of silicon in the reactor and creates dusts of iron and copper which must be removed downstream of the reactor to prevent contamination of the TCS. Some of the most beneficial catalysts like Copper (II) Chloride are difficult to feed to the reactor as it can cause plugging of the Me-Si feed system or the direct catalyst injection systems. The blending of catalysts also leads to the same problem of accumulation of iron and copper dusts that must be removed downstream of the reactor.

The present invention utilizes a high surface area of iron in both the reactor internals and the iron matrix of diffusers above the distributor plate to catalyze the reaction on the surface of those reactor parts. The ratio of iron surface area to Me-Si weight is the metric used to increase the catalytic effect. The ratio of iron to Me-Si in a typical fluidized bed reactor can be well below 0.02 m²/kg with an Incoloy® 800H reactor wall being the industrial standard for material of construction. The walls of the reactor are preferably Incoloy to prevent cracking from formation of metal chlorides. Studies of the reaction revealed that the yield of TCS was improved with any iron in the reactor and the yield was further improved when the iron area to silicon ratio was between 0.02-0.15 m²/kg. The introduction of high surface area iron on the distributor plate and internals increases the reaction rate by a factor of ten over an uncatalyzed reaction with Me-Si. The best implementation of the invention was accomplished with vertically mounted and horizontally supported carbon steel chains. The chains have a high resistance to wear, provide a large surface area for reaction, and help to prevent large bubble formation in the reactor. A matrix of diffusers composed of carbon steel and stainless steel was also placed on the distributor plate that allowed Me-Si to contact the matrix. Providing iron catalyst at the distributor is most beneficial as conversion is highest where the temperatures in the reactor are at their highest and bubbles are the smallest.

The iron was effective as a catalyst regardless of the type of steel with iron rich steel or steel alloy such as carbon steel, 304 stainless steel, 316 stainless steel, and Incoloy®, being effective; however, Incoloy® 800H contains the least iron content by a significant margin. The reaction may be accomplished with other alloys of iron as well.

The matrix of diffusers composed of carbon steel and stainless steel above the distributor and the carbon steel internals result in several advantages in addition to an improved yield of TCS by catalytic effect. The stationary metal results in much less catalyst dust in the system compared to iron and copper catalysts added as powders. The need for catalyst powder blending or alloying, which represent additional cost in material and operations, are not required. The operational difficulties with plugging in the catalyst injection or blending systems are also eliminated.

DETAILED DESCRIPTION OF THE INVENTION

In the polysilicon industry, trichlorosilane (TCS) is passed over a circuit of polysilicon seed rods heated to about 1000° C. to produce ultra-pure polysilicon. The TCS feed gas for the polysilicon reactors can be produced by the direct chlorination of metallurgical grade silicon by hydrogen chloride (HCl). This process is typically carried out in a fluidized bed reactor and produces a byproduct of silicon tetrachloride (STC) in the amount of 4-8 mol % in the product stream, depending on operating conditions, as shown in Equations (Eqs.) 1 and 2.

$$\text{Si mg (s)} + 3\text{HCl (g)} \approx \text{SiHCl}_3 \text{ (g)} + \text{H}_2 \text{ (g)} \quad (1)$$

$$\text{SiHCl}_3 \text{ (g)} + \text{HCl (g)} \approx \text{SiCl}_4 \text{ (g)} + \text{H}_2 \text{ (g)} \quad (2)$$

STC is similarly created as a byproduct of producing polysilicon rods whose process is approximated by Eqs. 3-5.

$$\text{SiHCl}_3 \text{ (g)} + \text{H}_2 \text{ (g)} \approx \text{Si(s)} + 3\text{HCl (g)} \quad (3)$$

$$\text{SiHCl}_3 \text{ (g)} + \text{HCl (g)} \approx \text{SiCl}_4 \text{ (g)} + \text{H}_2 \text{ (g)} \quad (4)$$

$$SiHCl_3\ (g) + H_2\ (g) \rightleftharpoons SiH_2Cl_2\ (g) + HCl\ (g) \quad (5)$$

The amount of STC in the product stream is between 1-5 mol % depending on batch time and operating conditions.

There is a limited market for the sale of STC to produce fumed silica and optical fibers. Inventory of STC in the manufacture of polysilicon must be carefully managed and can result in reduced production of polysilicon if stores reach maximum capacity. For these reasons, it is desirable to convert STC to the TCS feed stock for the polysilicon reactors by the hydrochlorination process as described in Eqs. 6-8:

$$SiCl_4\ (g) + H_2\ (g) \rightleftharpoons SiHCl_3\ (g) + HCl\ (g) \quad (6)$$

$$Si\ mg\ (s) + 3HCl\ (g) \rightleftharpoons SiHCl_3\ (g) + H_2\ (g) \quad (7)$$

$$(Overall)\ Si\ mg\ (s) + 3SiCl_4\ (g) + 2H_2\ (g) \rightleftharpoons 4SiHCl_3\ (g) \quad (8)$$

The hydrochlorination process can be used to reduce STC stores, produce TCS as a feed stock for the polysilicon reactors or for liquid sales, and reduce consumption of metallurgical silicon.

1. Pilot Scale

A pilot-scale reactor was designed for information critical to the design of an industrial-scale reactor. The TCS yield from the pilot-scale reactor was predicted with a mathematical model. The scalable mathematical model accounts for the hydrodynamics in a fluidized bed reactor. The mathematical model for the hydrochlorination reaction in a fluidized bed was verified from published TCS yields of a laboratory-scale reactor. Furthermore, the model was validated on the pilot-scale reactor. The model was adjusted for pilot-scale and some industrial-scale reactors. In addition, the pilot-scale model used thermocouples along the bed height to account for energy losses from the reaction and to the environment; a change from the isothermal assumption used for the laboratory-scale work. No further adjustments were necessary to model the pilot-scale system and the difference between experimentally observed yield and yield predicted by the model was less than ±7%.

Figure 1:
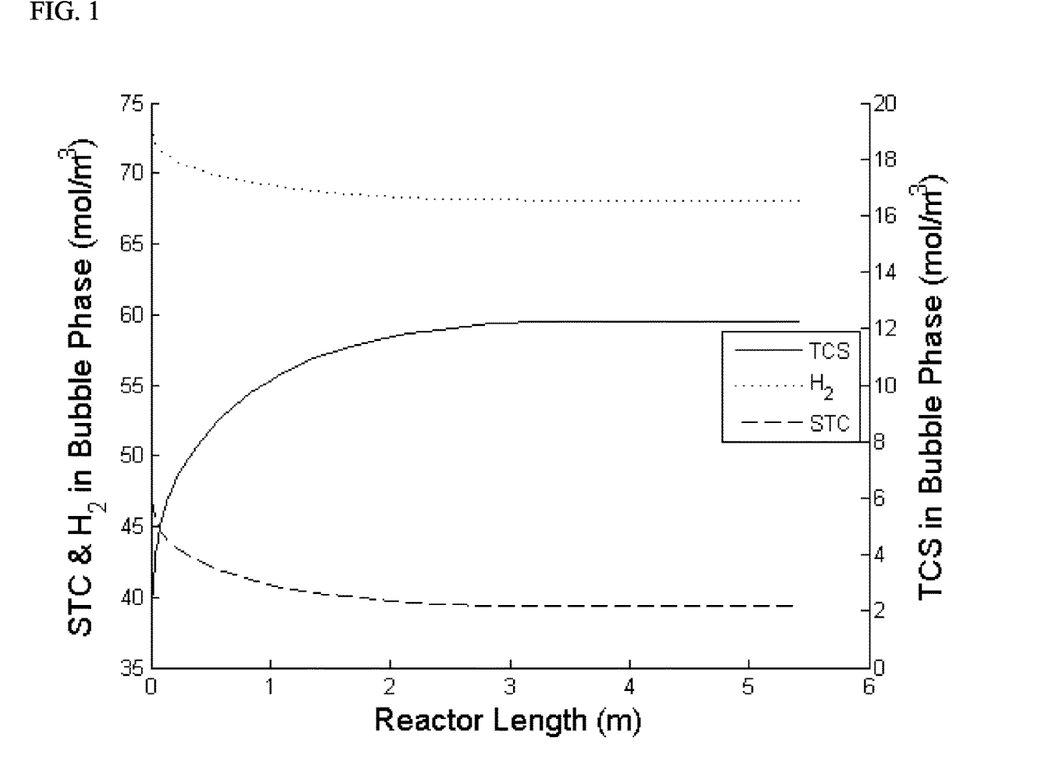
FIG. 1: TCS conversion in reactor versus vertical bed height.

The mathematical model results predicted that 90% of the final TCS conversion on a mol basis was achieved a quarter of the distance up the 5.48 m tall reactor as shown in FIG. 1.

The model showed a shortened design would be adequate for equilibrium conversion. A shortened reactor would also serve to further validate the mathematical model.

Two experiments were conducted in this reactor without copper catalyst and are shown in Table 1.

TABLE 1

Hydrochlorination experiments conducted without catalyst.

| Exp | bottom temp (° C.) | bottom pressure (PSIG) | molar ratio (H$_2$/STC) | X$_{HCL}$ (mol %) | W$_{Cu}$ (wt %) | u$_o$ (m/s) | F$_{TCS}$ (Norm) | Y$_{TCS}$ (mol %) |
|---|---|---|---|---|---|---|---|---|
| 1 | 457 | 116 | 0.99 | 3.5 | 0 | 0.111 | 0.865 | 15.1 |
| 2 | 512 | 116 | 1.08 | 3.5 | 0 | 0.119 | 1 | 18.3 |

The variable $X_{HCl}$ is the mole fraction of HCl gas in the feed, $W_{Cu}$ is the percent by weight of copper added to the metallurgical silicon feed stream, $u_o$ is the superficial gas velocity into the reactor, $F_{TCS}$ is the normalized mass flow rate of TCS produced by the reactor, and $Y_{TCS}$ is the molar yield of TCS calculated by Equation 9:

$$Y_{TCS} = \frac{3\dot{n}_{TCS,OUT} * 100}{4\dot{n}_{STC,IN} + \dot{n}_{HCl,IN}} \quad (9)$$

Where $\dot{n}_{TCS,OUT}$ is the molar flow rate of TCS produced by the reactor, $\dot{n}_{STC,IN}$ is the molar flow rate of STC gas fed to the reactor, and $\dot{n}_{HCl,IN}$ is the molar flow rate of HCl gas fed to the reactor. Surprisingly, Table 1 shows that the expected reduction in TCS yield was not observed and conversion was comparable to copper catalyzed experiments.

A decision was made to shorten the reaction section of the pilot-scale reactor to determine if the reaction was proceeding as quickly as shown by the model, to investigate the conversion rate achieved without added copper catalyst, and to test a new copper catalyst with improved material handling properties and less health hazards.

2. Equipment

The hydrochlorination system was used for the experiments. The reaction section of the fluidized bed was shortened to 25% of its original length from 5.48 m to 1.37 m. No other modifications were made to the system shown in FIG. 2.

Hereinafter, an explanation will be made of an embodiment of the present invention with reference to FIG. 2.

An apparatus 1 for producing trichlorosilane (TCS) is provided with a reactor 2, which is a fluidized bed reactor (FBR), a raw material supply hopper 3 for supplying metallurgical grade silicon powder (Me-Si) as a raw material to the reactor 2, a gas introduction line 4, for introducing a mixture of recovered hydrogen gas (H$_2$) containing some HCl, TCS, and dichlorosilane (DCS) and pure silicon tetrachloride (STC), and a gas discharge line 5 for discharging the generated gas containing trichlorosilane.

The reactor 2 is provided with a vessel or body 6 formed substantially in a straight cylindrical shape along the vertical direction, a bottom 7 connected to the lower end of the body 6, and a large diameter portion 8 connected coaxially to the upper end of the body 6. In this embodiment, the body 6 is formed with a substantially similar diameter to the bottom 7 and the space there between is partitioned by a horizontal distributor plate 9. On the other hand, a tapered portion 10 is formed at the upper part of the body 6, and the large diameter portion 8 is integrally connected to the upper end of the tapered portion 10. The diameter of the tapered portion 10 gradually increases in the upper direction thereof. Thus, the internal space of the body 6 is communicatively connected to that of the large diameter portion 8.

In addition, in this embodiment, the large diameter portion 8 has three members including a lower cylindrical member 11, an upper cylindrical member 12, and an upper cover 13.

The raw material supply hopper 3 supplies metallurgical grade silicon powder (Me-Si) (for example, the size is 1 μm or more and 1000 μm or less) from a raw material supply hopper 3 via a raw material supply tube 14 connected to the lower part of the body 6 to the reactor 2. In this configuration, the metallurgical grade silicon powder is supplied by gas transportation using a mixture of recovered hydrogen gas (H$_2$) with some HCl, TCS, and DCS as a carrier gas which enters the raw material supply tube 14 via a gas line 15. Furthermore the raw material supply hopper 3 can be connected to a dryer 35 via a line 36.

On the other hand, the gas introduction 4 introduces a mixture of recovered hydrogen gas (H$_2$) with some HCl, TCS, and DCS and pure STC into the bottom 7 of the reactor 2. This mixed gas will simply be referred to as a mixed gas of the primary components hydrogen and STC, although other gases are present like HCl, TCS, and DCS. Before reaching the gas introduction line 4, recovered $H_2$ gas with some HCl, TCS, and DCS enters the system via a line 16. Pure STC enters the system via a line 17 which enters an evaporator 18, for example a steam condenser/evaporator, before entering a line 19 which joins line 16 at a line junction 20. At line junction 20 a line 21 takes the mixed gas of hydrogen and STC to a heat exchanger 22 after which the mixed gas of hydrogen and STC enters a heater 24 via a line 23 before entering the gas introduction line 4. The STC and hydrogen mixed gas are heated in the heater 24 before introduction into the reactor 2 to temperatures between about 425-725° C.

A plurality of nozzles 25 are fixed along the vertical direction so as to penetrate the distributor plate 9 which partitions the bottom 7 of the reactor 2 from the body 6. The upper end openings of the nozzles 25 are arranged inside the body 6 and the lower end openings are arranged inside the bottom 7. Above the nozzles is a carbon/stainless steel and/or iron matrix 39 of material, diffusers for example, to contact the Me-Si from raw material supply tube 14 and gas exiting nozzles 25 on horizontal distributor plate 9. The matrix 39 of diffusers is composed of a material with a high surface area to volume ratio. Matrix 39 can be a matrix of stainless steel diffusers, for example. Matrix 39 can also be loose carbon steel diffusers in any shape. For example the matrix 39 can be random assortments of carbon steel, washers and ball bearings that provide an iron surface for catalysis of the reaction. The shape of the iron parts are not critical and are chosen to create a highly distributed flow pattern for the gas while providing large amounts of surface area for catalysis. The iron parts are contained by a retaining wall above the distributor and are too heavy to be fluidized. Then, mixed hydrogen and STC gas introduced by the gas introduction line 4 into the bottom 7 of the reactor 2 is ejected dispersively into the body 6 by each of the nozzles 25. Providing an iron catalyst as matrix 39 at the distributor plate 9 is most beneficial as conversion is highest where the temperatures in the reactor are at their highest and bubbles are the smallest. The reaction is typically carried out in reactor 2 at between about 590-680° C.

Inside a space 26 of the reactor 2 are arrangements of internals 27. Internals 27, for example, can be vertically mounted and horizontally supported, by a support 40, unfinished surface carbon steel chains. The chains have a high resistance to wear, provide a large surface area for reaction, and help to prevent large bubble formation in the reactor. Internals 27 can be other configurations besides chains, like rods, pipes, hollow tubes, and baffles.

The gas discharge line 5 sends the reacted fluid including trichlorosilane discharged from the reactor 2 to a gas purifying system 28 via a cyclone 29 and a line 30, and collects the metallurgical grade silicon fine powder (for example, the diameter is 5 μm or more and 40 μm or less) discharged along with the reacted fluid in the cyclone 29. The cyclone 29 discharges the dust via a line 37 and sends it to a disposal 38. Some reactors return a portion of the dust back to the reactor for additional reaction.

Additional processing involves a scrubber system 31. In this arrangement, scrubber system 31 is connected to a Fourier Transformed Infrared Analyzer (FTIR) 32 which takes a FBR inlet sample from line 21 via a line 33 and a FBR outlet sample via a line 34 from line 30.

This is the basic arrangement of the main components used in the system of the invention. Other components may be added and some details are not shown.

3. Experiments

Figure 2:
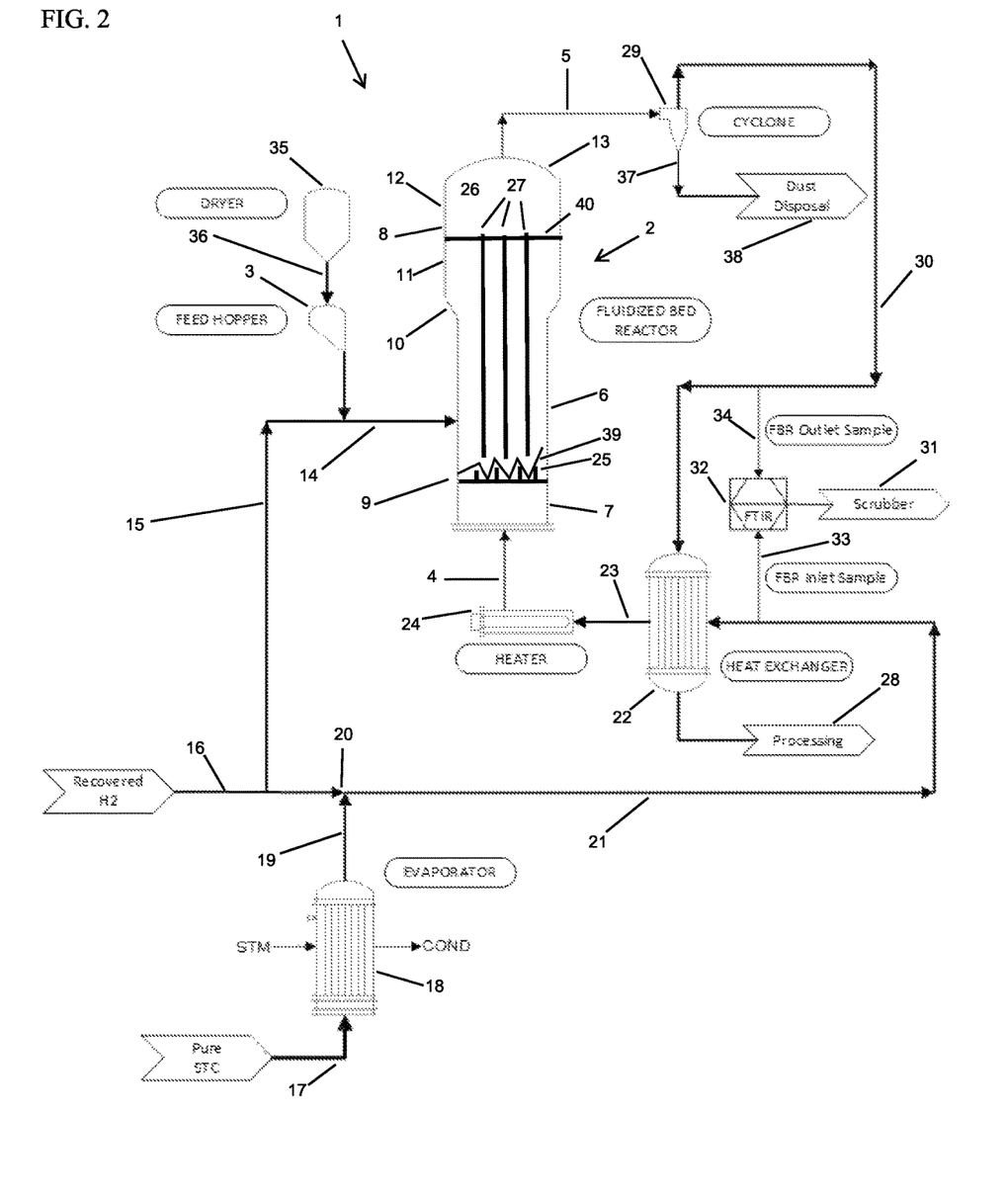
FIG. 2: Process flow diagram of hydrochlorination system.

For the experiments on the pilot scale reactor arranged in a system shown in FIG. 2, metallurgical grade silicon (Si mg) utilized was Silgrain from the Elkem Silicon Materials Company and was fed batch wise to the reactor 2 from a line 0.833 m in height (line 14) in the reaction section of the fluidized bed reactor 2. The hydrogen used for the reaction is from a recovery stream and contains some HCl (15,000-50,000 PPM), TCS (1,500-2,000 PPM), and dichlorosilane (DCS) (700-3,000 PPM). The chemical composition of the inlet stream varied by less than 10% for each constituent in the time frame of each experimental trial. Pure STC is vaporized in the evaporator 18 and blended with the hydrogen stream, heated to reaction temperature in the heater 24, and fed to the reactor 2 through the distributor plate 9.

The inlet and exhaust stream composition of the hydrochlorination system was determined by the Fourier Transformed Infrared Analyzer 32 (FTIR) calibrated for high concentrations of chlorosilanes. The STC concentration in the feed was determined by a mass flow controller as it was considered to be more accurate. In addition to the FTIR utilized, another FTIR was used for one experiment to verify the accuracy of results. The new FTIR was a MKS model MultiGas 2030 which was calibrated for a broad range of HCl, DCS, TCS, and STC by the Prism Analytical Technologies Company. The FTIR was equipped with an MKS custom built 2 cm cell, which contains a mirror outside of the process gas stream. This was determined to be a necessity as chlorosilanes quickly fouled the mirror of the standard cell. There were no fouling problems after installation of the custom cell and the cell temperature control environment was superior to that of the original FTIR system.

4. Mathematical Model

A mathematical model was used to predict the yield of TCS from the pilot-scale reactor and to serve as a basis for recommending an industrial-scale design. The model accounts for reacting gas (STC and hydrogen) entering the reactor through a distributor plate as tiny bubbles and coalescing as they travel up to form larger bubbles. The bubbles cause mass transfer inefficiencies. The reaction kinetics are dependent on the iron inherently present in metallurgical grade silicon ($r_{Fe_xSi_y}$) and parallel with a reaction with copper if added as a catalyst ($r_{Cu_xSi_y}$). The model is shown in Eq. 10:

$$-u_0 \frac{dC_{ib}}{dz} = f_b \rho_{Si} v_i (\gamma_{Fe} r_{Fe_xSi_y} + \gamma_{Cu} r_{Cu_xSi_y})_b + \delta K_{be}(C_{ib} - C_{ie}) \quad (10)$$

For the equation, i represents the chemical species either STC, hydrogen, or TCS and b stands for the bubble phase. Eq. 10 accounts for the consumption of a reactant or production of product chemical species of concentration C in the bubble phase by chemical reaction and by mass transfer to the emulsion phase e. The rate of mass transfer of chemicals to the emulsion phase is shown in Eq. 11:

$$\delta K_{be}(C_{ib} - C_{ie}) \cong f_e \rho_{Si} v_i (\gamma_{Fe} r_{FE_xSi_y} + \gamma_{Cu} r_{Cu_xSi_y})_e \quad (11)$$

The mass transfer of chemicals from the bubble phase to the emulsion phase is approximately equal to its rate of consumption or production in the emulsion phase. Below is a table of symbols:

TABLE 2

| Symbol | Meaning |
|---|---|
| C | component concentration, $mol^1 m^{-3}$ |
| f | volume of solids per volume of bed |
| K | gas interchange coefficient, $s^{-1}$ |
| ṅ | molar flow rate, $mol^1 s^{-1}$ |
| r | reaction rate, $mol^1 s^{-1} kg_{cat}^{-1}$ |
| $u_0$ | superficial velocity, $m^1 s^{-1}$ |
| v | stoichiometric coefficient |
| $Y_{TCS}$ | yield of TCS, see Eq.9, % |

TABLE 2-continued

| Symbol | Meaning |
|---|---|
| z | reactor height, m |
| δ | bed fraction in bubbles |
| ε | fraction of voids in the bed |
| γ | fractional weight of catalyst |
| ρ | density, $kg^1 m^{-3}$ |
| b | bubble phase |
| $Cu_xSi_y$ | copper catalysed reaction |
| e | emulsion phase |
| $Fe_xSi_y$ | iron catalysed reaction |
| i | component (STC, $H_2$, TCS) |
| IN | actual feed stream |
| mg | metallurgical grade silicon |
| OUT | product stream |
| Si | silicon |

Bubble rise velocity, the fraction of the bed in bubbles, and mass transfer coefficient ($K_{be}$) are strong functions of bubble size. Bubbles are small in size at the distributor and grow as they coalesce as they travel up the reactor.

The reactor yield of TCS was calculated with the Equation 9. The accuracy of the modeling results were determined by comparing the experimental TCS yield results as determined by FTIR with the results predicted by the model as shown in Eq. 12:

$$\%Diff = \frac{(Y_{TCS,EXPn} - Y_{TCS,PREDn})100}{Y_{TCS,EXPn}} \quad (12)$$

The model was used without modification, unless otherwise noted, to study the conversion of STC to TCS in the shortened conversion reactor.

5. Results

Before the reactor was shortened, two tests (Experiments 1 and 2) were performed without added catalyst. Subsequently, three experiments were conducted in the shortened reactor to study the effects of the shortened fluidized bed reactor height and catalyst. Experiment 3 in the shortened reactor was also conducted without catalyst. Experiments 4, 5A, and 5B were performed with copper alloyed metallurgical silicon from the Elkem Silicon Materials Company. The alloyed silicon contained 2.5% copper by weight and was blended in a ribbon mixer with Silgrain metallurgical silicon for a final copper weight of 0.1%. Experiments 5A and 5B were from the same reactor trial; however, outlet gas composition was studied by different FTIR analyzers. Experiment 5B was studied with a new FTIR analyzer as explained in the "3. Experiments" section above. The experimental conditions along with the observed results by FTIR and those predicted by the mathematical model are included in Table 3.

TABLE 3

Hydrochlorination reactor experimental results versus initial model predictions.

| Experiment | reactor length | heater temp (°C.) | bottom pressure (PSIG) | molar ratio ($H_2$/STC) | $X_{HCL}$ (mol %) | $W_{Cu}$ (wt %) | $u_o$ (m/s) | $F_{TCS}$ (Norm) | $Y_{TCS}$ (mol %) | $Y_{TCS}$ predicted (mol %) |
|---|---|---|---|---|---|---|---|---|---|---|
| 1 | Long | 457 | 116 | 0.99 | 3.5 | 0 | 0.11 | 0.768 | 15.1 | 11.1 |
| 2 | Long | 512 | 116 | 1.08 | 3.5 | 0 | 0.12 | 0.888 | 18.3 | 15.2 |
| 3 | Short | 552 | 112 | 1.41 | 2.2 | 0 | 0.15 | 1 | 20.6 | 14.5 |
| 4 | Short | 454 | 111 | 1.29 | 2.8 | 0.1 | 0.12 | 0.637 | 13.1 | 8.4 |
| 5A | Short | 531 | 112 | 1.22 | 2.8 | 0.1 | 0.14 | 0.925 | 18.1 | 14.1 |
| 5B | Short | 542 | 112 | 1.23 | 2.8 | 0.1 | 0.14 | 0.983 | 19.5 | 14.8 |

All experiments used the same distributer and internals, lengthened or shortened respectively depending on the reactor length.

6. Catalytic Effects

Surprisingly, there was no reduction in TCS yield in Experiment 1-3 even though no catalyst was added. Further, shortening the reactor did not reduce TCS yield in Experiments 3-5. The mathematical model predicted much less TCS yield and a possible explanation follows. Hydrochlorination preferentially occurs in the silicon where there is a silicon iron complex $Fe_xSi_y$. It is theorized that the reaction is catalyzed by the iron in the reactor walls, internals, and distributor plate, and random iron pieces located above the distributor plate. This explanation would also support the observation of no reduction in conversion given a shortened reactor length.

It was shown in the modeling work that the fractional iron weight ($\gamma_{Fe}$) in the metallurgical silicon should be doubled when HCl is included in the feed gas to account for increased reactivity. The increase in reactivity is thought to occur by the action of HCl on the silicon surface as it rapidly removes the less reactive oxidized silicon layer thereby exposing more iron inherent to the metallurgical silicon for reaction. For the metallurgical silicon used in this study the weight fraction of iron to silicon was 0.0029 $kg_{Fe}/kg_{Si}$, which was adjusted to a value of 0.0058 $kg_{Fe}/kg_{Si}$ to account for the HCl present in the feed gas and the model predictions with this value are shown in Table 3. Thus the range of $kg_{Fe}/kg_{Si}$ can be from 0.0029 to 0.0058 $kg_{Fe}/kg_{Si}$. This fraction weight was further adjusted in light of the known catalytic effects of iron from the reactor walls, internals, and matrix above the distributor until TCS yield in Experiment 2 reached an equilibrium value. The fractional value of iron to silicon weight was increased almost tenfold to a value of 0.055 $kg_{Fe}/kg_{Si}$ beyond which no appreciable increase in TCS conversion was realized. The TCS yield was increased from a value of 15.2 to 17.5 mol % while the value calculated from the FTIR was 18.3 mol %. The adjusted value for the iron to silicon fraction was subsequently used to model all the experiments and the results are shown in Table 4.

TABLE 4

Hydrochlorination experiment results versus modified model predictions.

| Exp | reactor length | heater temp (° C.) | $Y_{TCS}$ (mol %) | $Y_{TCS}$ predicted (w/Cat$_{fe}$) (mol %) | difference (%) | γ Ratio Fe/Si $kg_{Fe}/kg_{Si}$ |
|---|---|---|---|---|---|---|
| 1 | Long | 457 | 15.1 | 15.7 | −3.9 | 0.055 |
| 2 | Long | 512 | 18.3 | 17.5 | 4.3 | 0.055 |
| 3 | Short | 552 | 20.6 | 19.3 | 6.5 | 0.055 |
| 4 | Short | 454 | 13.1 | 13.9 | −6.5 | 0.055 |
| 5A | Short | 531 | 18.1 | 18.1 | −0.2 | 0.055 |
| 5B | Short | 542 | 19.5 | 18.5 | 5.1 | 0.055 |

Figure 3:
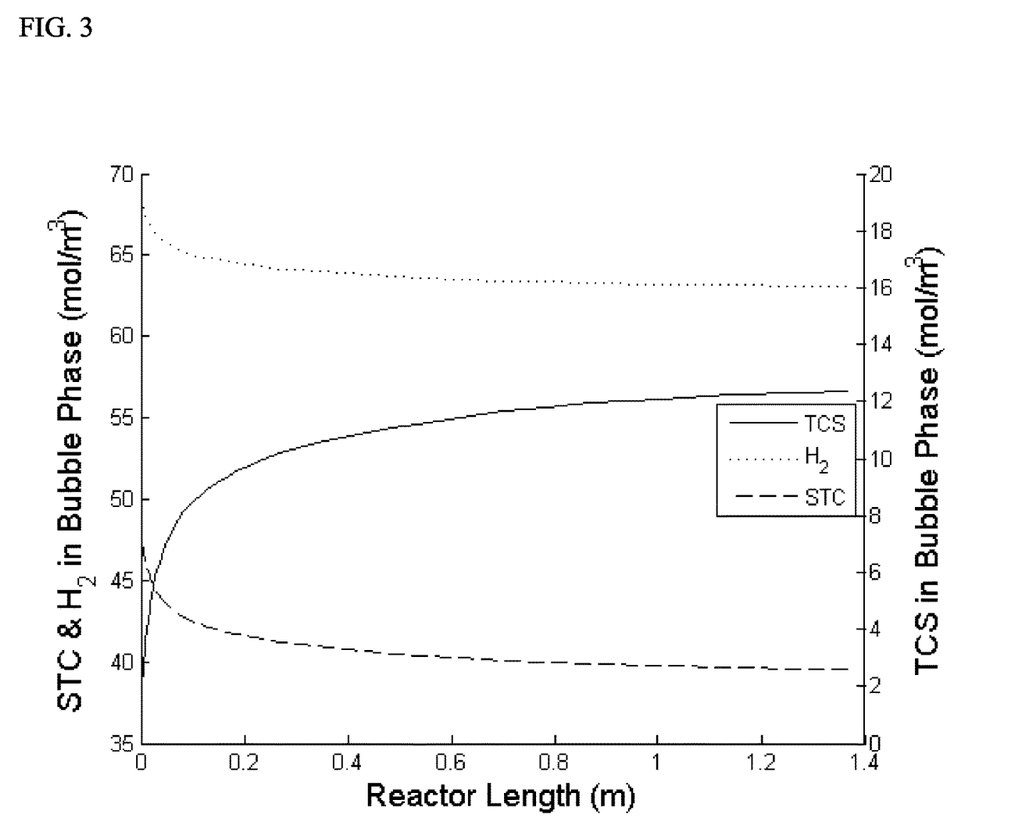
FIG. 3: Hydrochlorination reaction progress versus bed height in a shortened reactor.

With the adjustment to the iron fraction of catalyst, the model predicted experimental TCS yield with less than ±7% difference. The consumption and production rate of the hydrochlorination chemicals are shown for Experiment 3 in FIG. 3. Experiments 3-5 were conducted with a copper alloyed metallurgical silicon catalyst from the Elkem Silicon Materials Company. Unfortunately, the catalytic effect of the iron was so strong that the model did not show a significant change in TCS yield when the kinetics of the copper catalyst were incorporated.

The iron parts providing a surface for catalyzed reaction include the reactor distributor, the iron parts matrix of diffusers above the distributor, the internals, and the reactor walls. The majority of the surface area is provided by the matrix above the distributor (64%) and the internals (21%) with the balance from the reactor walls (15%). The internals in the reactor were eight chains made of unfinished steel, 5/16 trade size, and 1.37 m in length. It is desired that iron content in the steel of the internals, like steel chains, should be above about 61 wt % or preferably in the range of about 65 wt % to 72 wt % with a carbon content between about 0.3-0.8 wt %.

The matrix of iron was stacked two inches above the distributor thereby surrounding the distribution nozzles. One thousand carbon steel ball bearings were added, and 22,000 washers were added. The ball bearings were made of carbon steel and measured 11.11 mm in diameter. The washers were stainless steel and had an outer diameter of 8 mm and inner diameter of 3 mm and a thickness of 0.5 mm. High surface area diffusers are considered to have a surface area to volume ratio (SA/vol) in the range of 1 to 1000 $m^{-1}$, preferably about 500 to 10,000 $m^{-1}$, but must be heavy enough to prevent fluidizing in the bed, where the critical weight is a function of superficial gas velocity. For example the surface area to volume ratio of ball bearings is about 540 $m^{-1}$ and the surface area to volume ratio of a washers is about 8582 $m^{-1}$. By comparison the surface area to volume ratio of a chain is about 492 $m^{-1}$, while a capped tube with the same width as a chain is 147 $m^{-1}$, so the chain has a superior surface area to volume ratio. The ball bearings were chosen as carbon steel as corrosion was not an issue; however, carbon steel washers corroded and coagulated with the Me-Si. The stainless steel washers showed greater corrosion resistance. The higher the iron content in the steel, the better its action as a catalyst with carbon steel and secondarily stainless steel having a much higher iron content then alloys like Hastelloy® or Incoloy®. It is desired that iron content in the steel in the diffusers, like balls and washers, should be above about 61 wt % or preferably in the range of about 65 wt % to 72 wt %. It is preferable to have a nickel content of about 10 wt % and a molybdenum content of about 2 wt % for the washers. It is preferable to have a carbon content of between 0.3-0.8 wt % for the ball bearings. It is best to have both an iron matrix of diffusers above the distributor and iron in the internals so that contact with the fluidized Me-Si occurs throughout the entire reaction region of the reactor. The internals and iron matrix above the distributor should have all oils removed before installation into the reactor; however, no special treatment is needed to remove oxidation as oxidation is rapidly removed by the reaction process. A deterioration in catalytic activity after several campaigns was not observed. The amount of Me-Si required for reaction is fixed by the reaction chemistry and fluidized bed hydrodynamics. If an increase in iron ratio is desired, it is best to accomplish this by adding internals and increasing the depth of the iron matrix above the distributor.

The surface area of iron to weight of metallurgical silicon in the reactor is an important parameter to consider for scale-up calculations. The ratio of iron surface to Me-Si weight for the pilot-scale reactor without the internals and iron matrix above the distributor was calculated to be 0.02 $m^2/kg$. In scale-up of reactors, the reactor volume and subsequently the required Me-Si for reaction increase at a much greater rate than does the surface area of the walls. In addition, the walls are typically made of Incoloy® which is a less effective catalyst. The final ratio of iron surface area to weight of Me-Si in an industrial-scale reactor may be reduced to 0.01 $m^2/kg$ without baffles and diffusers because in scale-up the reactor walls are a smaller fraction of the reaction section volume. A critical range of iron surface area to weight of Me-Si is 0.02 $m^2/kg$ to 0.15 $m^2/kg$, preferably 0.05 $m^2/kg$ to 0.15 $m^2/kg$, and more preferably 0.10 to 0.15 $m^2/kg$. Iron surface area to weight of Me-Si must be maintained to provide sufficient iron surface area for catalysis. This would be best achieved by adding sufficient iron internals and iron matrix above the distributor. The true metric of surface area to volume is how much of the reactor is occupied with catalyst (iron parts) to achieve the surface area of iron to weight of Me-Si metric of 0.11 $m^2/kg$, 0.12 $m^2/kg$, 0.13 $m^2/kg$, 0.14 $m^2/kg$ or 0.15 $m^2/kg$. If the reactor, internals, and matrix do not contain enough surface iron, the iron is not in the entire reaction zone and catalysis is below theoretical efficiency. If the surface iron amount is too large, then there is not as much volume inside the reactor to fluidize the Me-Si and the result is less throughput from the reactor.

In scaled-up reactors the length of the reaction region in a fluidized bed reactor is typically in the range of 3.0 m to 6.0 m. The results of the experiments showed that the fluidized bed reactor length can be reduced 75% to a length of about 25% of the original length without an effect on TCS yield. Thus in a scaled-up reactor the reduced length can be in the range of 0.9 m to 2.9 m.

7. Analytical Results & Validation

To help validate the calibration of the original FTIR and the adjustment of the modeled parameter of iron to silicon ratio to a value of 0.055 $kg_{Fe}/kg_{Si}$, a second FTIR was purchased to analyze the exhaust stream of the hydrochlorination reactor and is described in the "3. Experiments" section above. In the time required to switch the sample system from the original analyzer to the new analyzer the bottom temperature of fluidized bed reactor increased from 531° C. to 542° C. Given this temperature increase, the model predicted an increase of TCS yield from about 18.1 to 18.5 mol %. The TCS yield as calculated with data from the new FTIR was about 19.5 mol % representing a difference of about 7.7% from the value of the original FTIR and a difference of 5.1% from the modeled value. Because the difference in values were both less than about 10%, the calibration of the original FTIR and the adjustment of the value of iron to silicon ratio of 0.055 $kg_{Fe}/kg_{Si}$ were considered validated. The modeled value of 0.055 $kg_{Fe}/kg_{Si}$ occurs by creating a reaction environment in the reactor with 0.11 m²/kg surface area of iron per kg of fluidized Me-Si by adding iron internals and an iron matrix above the distributor.

A pilot-scale reactor was tested without catalyst addition and then shortened to one quarter of its original length to study mass transfer and catalytic effects. As expected from the original testing, shortening the reactor did not reduce TCS yield. Surprisingly, the removal of copper catalyst did not decrease TCS yield in either the original reactor or the shortened reactor. It was concluded that iron in the reactor walls, internals, and distributor are acting as a catalyst. With an adjustment to the iron to silicon weight fraction, the model predicted TCS yield for all five experiments with less than ±7% difference compared to yield calculated by FTIR analysis. A new FTIR was successfully used to validate the original FTIR calibration and to confirm the TCS yield of the hydrochlorination system.

The present invention is not limited to the embodiments and various modifications may be made without departing from the concept of the present invention.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

The invention claimed is:

1. A reactor for producing trichlorosilane (TCS) from the hydrochlorination of silicon tetrachloride (STC) with hydrogen in the presence of metallurgical silicon (Me-Si) comprising:
a reactor vessel comprising:
a distributor plate at the bottom of the inside reactor vessel;
internals inside the vertical length of the reactor vessel with the internals having a high surface area of iron; and
a matrix on the distributor plate with a high surface area of iron to catalyze reactions on the surface of the matrix.

2. The reactor according to claim 1, wherein the internals include vertically mounted and horizontally supported unfinished surface carbon steel chains.

3. The reactor according to claim 2, wherein the internals include iron in the form of an iron rich steel or steel alloy selected from the group consisting of: carbon steel, 304 stainless steel and 316 stainless steel.

4. The reactor according to claim 3, wherein the iron content in steel is greater than about 61 wt %.

5. The reactor according to claim 1, wherein the matrix is a matrix of carbon steel and stainless steel placed on the distributor plate that allows Me-Si to contact the matrix.

6. The reactor according to claim 1, wherein the matrix includes iron in the form of an iron rich steel or steel alloy selected from the group consisting of: carbon steel, 304 stainless steel and 316 stainless steel.

7. The reactor according to claim 6, wherein the iron content in steel is greater than about 61 wt %.

8. The reactor according to claim 1, wherein the matrix on the distributor plate is iron diffusers with a surface area to volume ratio of about 500 m$^{-1}$ to about 10,000 m$^{-1}$.

9. The reactor according to claim 1, wherein when silicon is added to the reactor vessel, the iron area in the fluidized bed reactor to silicon weight ratio is between about 0.02-0.15 m²/kg.

10. The reactor according to claim 1, wherein the reactor height is approximately 0.9 to 2.9 meters.

11. A reactor for producing trichlorosilane (TCS) from the hydrochlorination of silicon tetrachloride (STC) with hydrogen in the presence of metallurgical silicon (Me-Si) comprising:
a reactor vessel comprising:
walls formed of steel having at least 61 wt % iron;
a distributor plate at the bottom of the inside reactor vessel;
internals being vertically mounted and horizontally supported unfinished surface carbon steel chains with the internals formed of steel having at least 61 wt % iron; and
a matrix on the distributor plate with iron diffusers with a surface area to volume ratio of 540 to 8583 m$^{-1}$ and an iron content of at least 61 wt % to catalyze reactions on the surface of the matrix.

12. The reactor according to claim 11, wherein the reactor height is approximately 0.9 to 2.9 meters.

13. The reactor according to claim 11, wherein when silicon is added to the reactor vessel, the iron area in the fluidized bed reactor to silicon weight ratio is between about 0.02-0.15 m²/kg.

14. A method for producing trichlorosilane (TCS) from the hydrochlorination of silicon tetrachloride (STC) with hydrogen in the presence of metallurgical silicon (Me-Si) comprising:
providing a fluidized bed reactor reaction vessel having internals with a high surface area of iron and having a matrix on a distributor plate with a high surface area of iron to catalyze reactions on the surface of those reactor parts;
introducing metallurgical silicon into the fluidized bed reactor such that the iron area in the fluidized bed reactor to silicon weight ratio is between about 0.02-0.15 m²/kg;
introducing hydrogen gas and silicon tetrachloride into the fluidized bed reactor; and
discharging trichlorosilane, the product of a hydrochlorination reaction of silicon tetrachloride, hydrogen, and metallurgical silicon, from the fluidized bed reactor.

15. The method according to claim 14, wherein when silicon is added to the reactor vessel, the iron area to silicon weight ratio is between about 0.10-0.15 m²/kg.

* * * * *